US009844986B2

United States Patent
Harper

(10) Patent No.: US 9,844,986 B2
(45) Date of Patent: Dec. 19, 2017

(54) APPARATUS AND METHOD OF INSTALLING AN INTERNAL LOCKING RING TO REINFORCE AN ADJUSTABLE TRAILER HITCH

(71) Applicant: Progress Mfg. Inc., Provo, UT (US)

(72) Inventor: Jason Robert Harper, Springville, UT (US)

(73) Assignee: Progress Mfg. Inc., Provo, UT (US)

( * ) Notice: Subject to any disclaimer, the term of this patent is extended or adjusted under 35 U.S.C. 154(b) by 0 days.

(21) Appl. No.: 15/143,371

(22) Filed: Apr. 29, 2016

(65) Prior Publication Data

US 2016/0243909 A1   Aug. 25, 2016

Related U.S. Application Data

(63) Continuation-in-part of application No. 14/226,815, filed on Mar. 26, 2014, now Pat. No. 9,352,624.

(60) Provisional application No. 61/970,271, filed on Mar. 25, 2014.

(51) Int. Cl.
| | |
|---|---|
| *B60D 1/28* | (2006.01) |
| *B60D 1/06* | (2006.01) |
| *B60D 1/46* | (2006.01) |
| *B60D 1/52* | (2006.01) |

(52) U.S. Cl.
CPC ............. *B60D 1/28* (2013.01); *B60D 1/06* (2013.01); *B60D 1/46* (2013.01); *B60D 1/52* (2013.01)

(58) Field of Classification Search
CPC .............. B25B 27/06; B60D 1/06; B60D 1/46
See application file for complete search history.

(56) References Cited

U.S. PATENT DOCUMENTS

| | | | |
|---|---|---|---|
| 3,995,360 A | * | 12/1976 | Millheiser ............... B25B 27/20 |
| | | | 29/229 |
| 4,111,464 A | | 9/1978 | Asano et al. |
| 4,141,129 A | * | 2/1979 | Martini ................. B23P 19/084 |
| | | | 29/235 |
| 4,186,575 A | | 2/1980 | Bulle |
| 4,662,656 A | | 5/1987 | Douglas et al. |
| 4,872,710 A | | 10/1989 | Konecny et al. |
| 4,925,205 A | | 5/1990 | Villalon et al. |
| 5,018,759 A | | 5/1991 | Villalon et al. |
| 5,354,087 A | | 10/1994 | Head |
| 5,411,350 A | | 5/1995 | Breault |
| 5,413,366 A | | 5/1995 | Gibbons |
| 5,509,750 A | | 4/1996 | Boike |
| 5,975,553 A | | 11/1999 | Van Vleet |
| 6,179,347 B1 | | 1/2001 | Dole et al. |

(Continued)

*Primary Examiner* — Kevin Hurley

(74) *Attorney, Agent, or Firm* — Morriss O'Bryant; Compagni Cannon, PLLC

(57) ABSTRACT

An adjustable height trailer hitch may include a shank portion configured and adapted to be installed into a hitch receiver. The hitch may further include a drop bar extending downwardly from the shank portion. The drop bar may further include a plurality of pin receiving holes formed in the drop bar. The hitch may further include a ball support member having a locking pin disposed in a locking-pin bore and an actuator pin disposed in an actuator bore. The hitch may further include a locking ring disposed in an annular groove of a cylindrical sidewall of the actuator bore. The locking ring may prevent backout of the actuator pin.

24 Claims, 11 Drawing Sheets

(56) References Cited

U.S. PATENT DOCUMENTS

| | | |
|---|---|---|
| 6,256,852 B1 * | 7/2001 | Decker .................. B25B 27/06 |
| | | 29/229 |
| 6,507,985 B1 * | 1/2003 | Loughlin .............. B23P 19/084 |
| | | 29/215 |
| 6,517,119 B2 | 2/2003 | Thomas |
| 6,540,426 B2 | 4/2003 | Cloyd et al. |
| 6,575,488 B2 | 6/2003 | Massey |
| 6,644,887 B2 | 11/2003 | Hesse |
| 6,824,156 B2 | 11/2004 | Smith |
| 6,974,148 B2 | 12/2005 | Moss et al. |
| 6,976,695 B1 | 12/2005 | Smith, III |
| 6,993,816 B2 * | 2/2006 | Greenhill ............ B25B 27/0028 |
| | | 29/229 |
| 7,165,426 B2 | 1/2007 | Wyers |
| 7,338,065 B1 | 3/2008 | Clausen |
| 7,451,996 B2 | 11/2008 | Miles et al. |
| 8,011,685 B2 | 9/2011 | Belinky et al. |
| 8,240,719 B2 | 8/2012 | Udhofer et al. |
| 8,408,577 B2 | 4/2013 | Works |
| 8,505,955 B2 | 8/2013 | Kramer |
| 8,979,112 B2 | 3/2015 | Weipert et al. |
| 2010/0127479 A1 | 5/2010 | Weipert et al. |

* cited by examiner

APPARATUS AND METHOD OF INSTALLING AN INTERNAL LOCKING RING TO REINFORCE AN ADJUSTABLE TRAILER HITCH

CROSS-REFERENCE TO RELATED APPLICATIONS

This application is a continuation in part of U.S. patent application Ser. No. 14/226,815, filed Mar. 26, 2014, which claims the benefit of U.S. Provisional Application No. 61/970,271 filed Mar. 25, 2014, both of which are hereby incorporated by reference herein in their entireties, including but not limited to those portions that specifically appear hereinafter, the incorporation by reference being made with the following exception: In the event that any portion of any of the above-referenced applications are inconsistent with this application, this application supercedes said above-referenced applications.

STATEMENT REGARDING FEDERALLY SPONSORED RESEARCH OR DEVELOPMENT

Not Applicable.

BACKGROUND

1. The Field of the Present Disclosure.

The present disclosure relates generally to trailer hitches, and more particularly, but not necessarily entirely, to adjustable height trailer hitches.

2. Description of Related Art

Trailer hitches are utilized to couple tow vehicles and trailers. In a standard configuration, a trailer hitch may comprise a receiver permanently mounted to the undercarriage of the tow vehicle. A ball mount may include a shank portion configured and adapted to be installed in the receiver. The ball mount may further include a bore for a shaft of a hitch ball. Conventional ball mounts may include a fixed drop portion for providing a height difference between the receiver and the hitch ball. It will be appreciated that the height difference between the hitch ball and the receiver, referred to as drop, may be necessary for safe towing as the trailer should always be as level as possible.

More recently, hitches have been constructed with a variable drop. In particular, the hitches may include a drop bar having a plurality discrete mounting locations for a ball support member. The ball support member may be selectively secured to any one of the plurality of discrete mounting locations using a pin. In some instances, the pin may be manually inserted by a user through a bore in the ball support member that is aligned with a bore in the drop bar. In other instances, the pin may be integrated into the ball support member.

As shown in FIG. 1, a previously available adjustable height trailer hitch 10 includes a shank portion 12. Extending downwardly from the shank portion 12 may be a drop bar 14. A face 16 of the drop bar 14 may include a plurality of pin receiving holes 18. Mounted to the drop bar 14 may be a ball support member 20. The ball support member 20 may include a body member 22 having at least one hitch ball 24 mounted thereto. The body member 22 may include a pair of L-shaped arms 26 that define a slot 28 for receiving the drop bar 14.

The hitch 10 may further include a first locking pin 30 for securing the shank portion 12 in a receiver (not shown) attached to a tow vehicle. The first locking pin 30 may be extended and retracted via a barrel type key inserted into a key cylinder accessible from the face 16 of the drop bar 14. The ball support member 20 may further include a second locking pin 34 (seen in FIG. 2) that extends and retracts to selectively engage one of the plurality of pin receiving locations, such as holes 18. The position of the second locking pin 34 may be extended and retracted via a barrel type key 33 inserted into a key cylinder 36 (seen in FIG. 2) accessible from a side of the ball support member 20.

Referring now to FIG. 2, a cross-sectional view of the ball support member 20 and where like reference numerals depict the same components, the interaction between the second locking pin 34 and the key cylinder 36 is shown in more detail. In particular, the ball support member 20 may include a first bore 40 and a second bore 42. The second locking pin 34 may be disposed in the first bore 40. The key cylinder 36 may be disposed in the second bore 42. Interconnecting the second locking pin 34 and the key cylinder 36 may be an actuating pin 44 having a proximal end 46 and a distal end 48.

The proximal end 46 of the actuating pin 44 may include a slot 50 for engaging a protrusion 52 extending from the key cylinder 36. The distal end 48 of the actuating pin 44 may engage a sidewall 54 of the second locking pin 34 such that rotation of the actuating pin 44 may cause the second locking pin 34 to extend and retract from the ball support member 20. In this regard, a cam assembly may interconnect the distal end 48 of the actuating pin 44 and the sidewall 54 of the second locking pin 34. As known to those of ordinary skill, the cam assembly may translate the rotational motion of the actuating pin 44 into linear motion of the second locking pin 34. The cam assembly may include an eccentric protrusion formed in the distal end 48 of the actuating pin 44 and an eccentric slot formed in the sidewall 54 of the second locking pin 34.

The second locking pin 34 may be secured in the first bore 40 by virtue of the cam assembly. The actuating pin 44 and the key cylinder 36 may be secured in the second bore 42 by a fastener 49 that engages the key cylinder 36. The ball support member 20 may include a bore 60 for receiving a hitch ball. O-rings 62 may be utilized to prevent water and other substances from interfering with the operation of the actuating pin 44 and the locking pin 34. While the hitch 10, shown in FIGS. 1 and 2, has proven successful in the marketplace, improvements are still being sought. For example, it would be an improvement to provide enhanced durability and strength to the components of the hitch 10.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
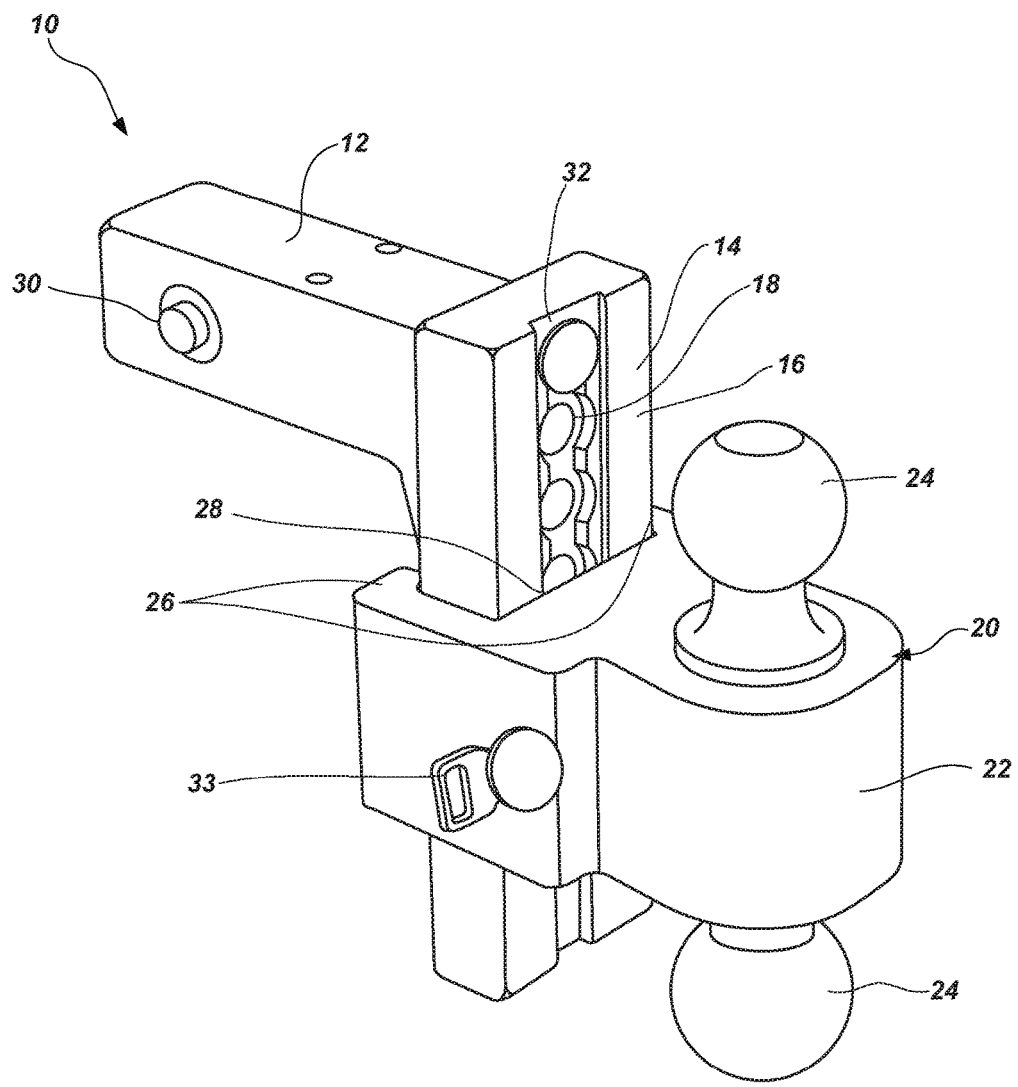
FIG. 1 is a view of a previously available trailer hitch assembly with variable height adjustability.
Figure 2:
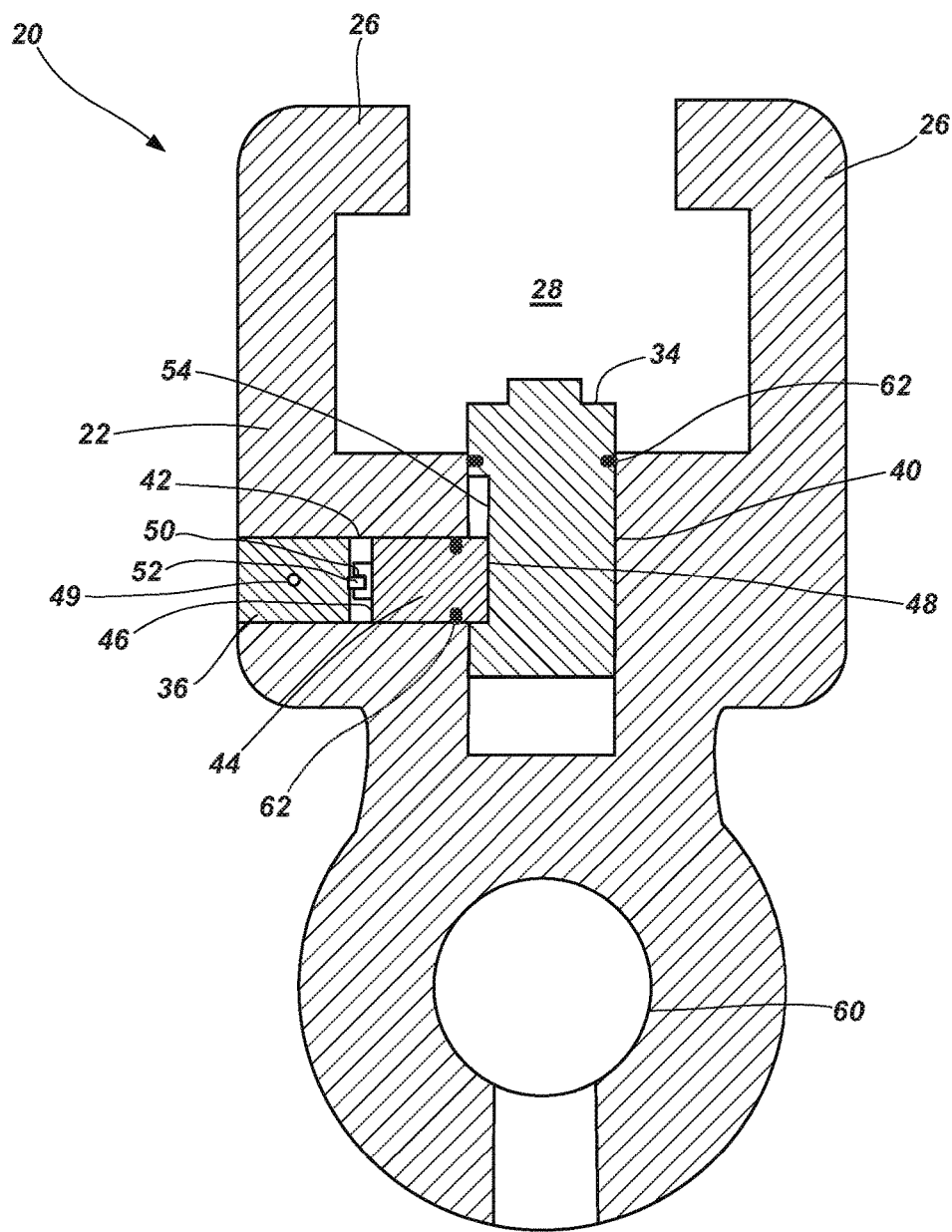
FIG. 2 is a cross-sectional view of the prior art ball support member shown in FIG. 1.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. As used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Applicant has discovered an improved adjustable height trailer hitch that improves securement of the actuator pin and, optionally, the key cylinder. In an embodiment, the applicant's adjustable height trailer hitch may include a ball mount assembly having an actuating pin disposed in an actuating bore for deploying and retracting a locking pin disposed in a locking-pin bore. The ball mount assembly may further include an annular groove formed in the actuator bore. A locking ring may be installed in the annular groove to secure the actuating pin in the actuating bore for preventing backout of the actuating pin.

Applicant has further invented a tool for installing the locking ring in the first bore. The tool may include a body member defining a hollow cylindrical passage. Disposed within the hollow cylindrical passage may be a plunger having a ring engaging surface disposed on its distal end. A resilient member, such as a spring, may bias the plunger. A locking ring may be compressed and inserted into the hollow cylindrical passageway. The plunger may be utilized to eject the locking ring from the hollow cylindrical passageway.

Figure 3:
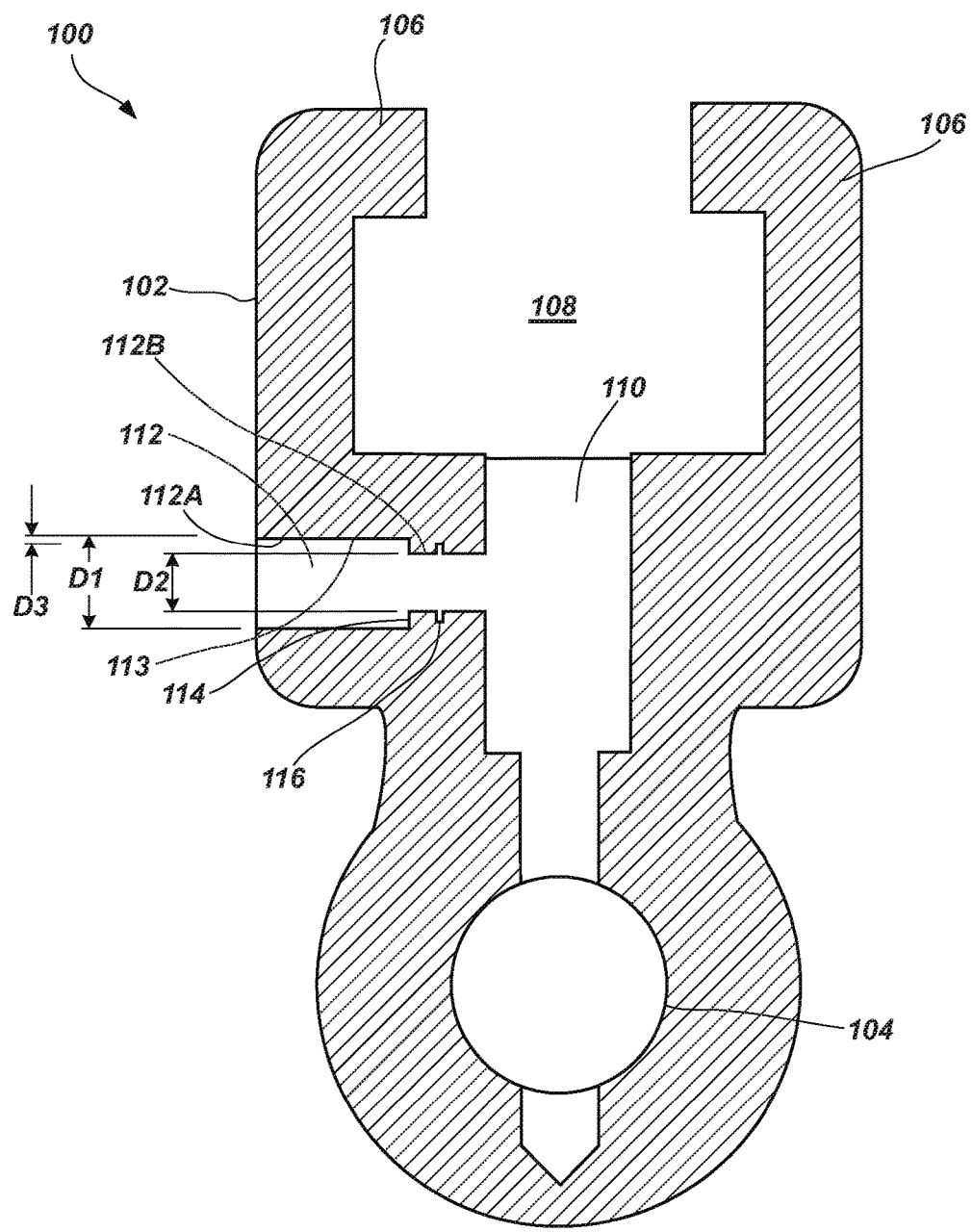
FIG. 3 is a cross-sectional view of the ball support member according to an embodiment of the present disclosure.

Referring now to FIG. 3, there is shown a cross-sectional view of a ball support member 100 according to an embodiment of the present disclosure. It will be appreciated that the ball support member 100 may be mountable onto a drop bar connected to a shank similar to the ones shown in FIG. 1. The drop bar may include pin receiving locations, including pin receiving bores. The ball support member 100 may include a body member 102 having at least one bore 104 for mounting a hitch ball. The body member 102 may include a pair of L-shaped arms 106 that define a slot 108 for receiving a drop bar.

The body member 102 may further include a locking-pin bore 110 for receiving a locking pin. The body member 102 may further include an actuator bore 112 defining a sidewall 113. In an embodiment, the sidewall 113 is cylindrical. The actuator bore 112 may include a first portion 112A having a diameter D1 and a second portion 112B having a second diameter D2, where D1 is greater than D2.

Interposed between the first portion 112A and the second portion 112B may be a shoulder 114 having a height D3. Formed in the sidewall 113 of the second portion 112B of the bore 112 may be a groove 116. In an embodiment, the groove 116 may be an annular groove. In an embodiment, the groove 116 may be non-annular. As will be explained in detail hereinafter, the groove 116 may be configured and dimensioned to receive a locking ring. As seen in FIG. 3, the locking-pin bore 110 and the actuator bore 112 may be in communication with each other.

Figure 4:
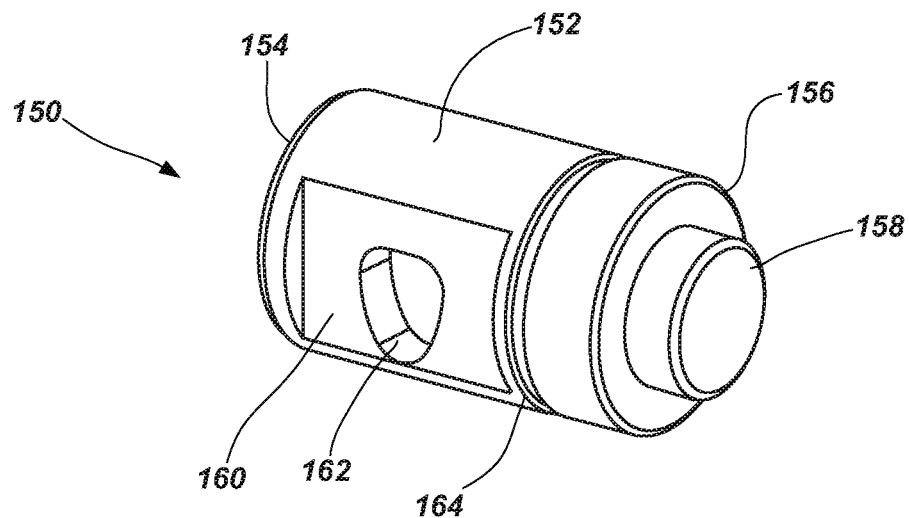
FIG. 4 is a perspective view of a locking pin according to an embodiment of the present disclosure.

Referring now to FIG. 4, there is shown a locking pin 150 according to an embodiment of the present disclosure. The locking pin 150 may comprise a cylindrical body 152 extending from a proximal end 154 to a distal end 156. Extending from the distal end 156 may be a cylindrical protrusion 158. A cutout 160 may be formed in the cylindrical body 152. An eccentric recess 162 by be formed in the cutout 160. An annular groove 164 configured and adapted to receive an O-ring may formed on the body 152.

Figure 5:
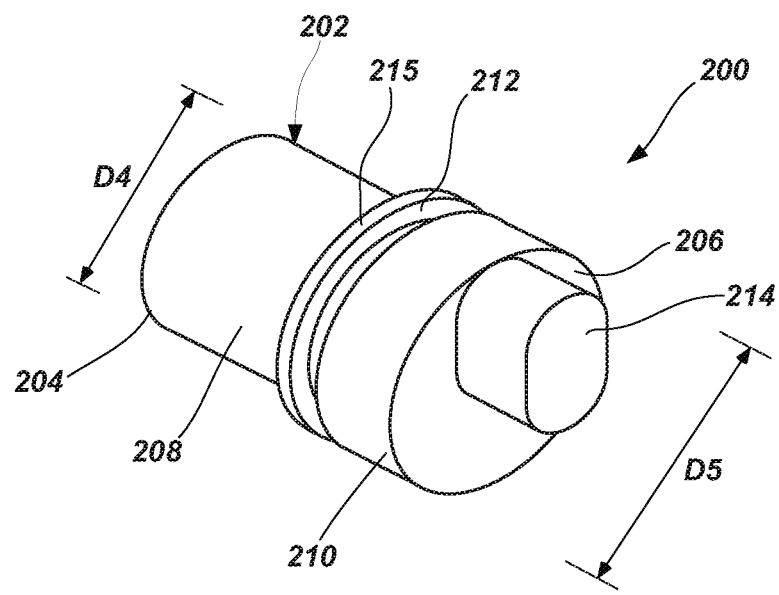
FIG. 5 is a perspective view of an actuating pin according to an embodiment of the present disclosure.

Referring now to FIG. 5, there is shown an actuating pin 200 according to an embodiment of the present disclosure. The actuating pin 200 may include a body member 202 extending from a proximal end 204 to a distal end 206. The body member 202 may include a first portion 208 having a diameter D4 and a second portion 210 having a diameter D5, where D5 is greater than D4. Formed in the second portion 210 may be an annular groove 212 for receiving an o-ring. Extending from the body member 202 of the actuating pin 200 may be a surface or shoulder 215.

Extending from the distal end 206 may be an eccentric protrusion 214. Referring now to FIGS. 4 and 5, the eccentric protrusion 214 and the eccentric recess 162 may form a cam assembly for converting the rotational movement of the actuating pin 200 into linear movement of the locking pin 150 as is known to those having ordinary skill.

Figure 6:
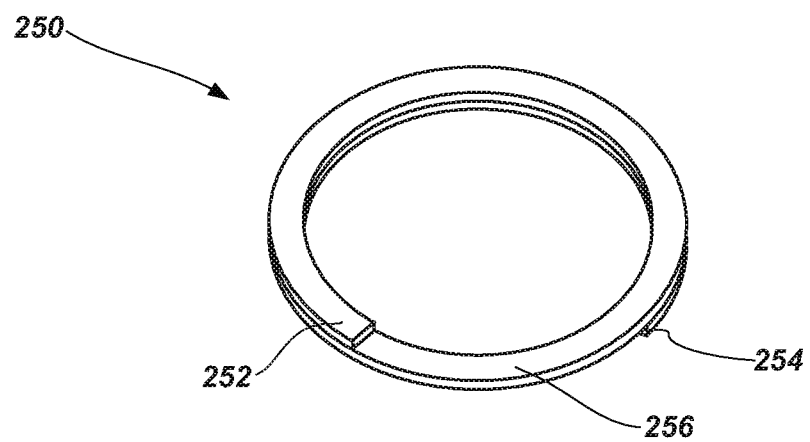
FIG. 6 is a perspective view of a locking ring according to an embodiment of the present disclosure.

Referring now to FIG. 6, there is depicted a locking ring 250 according to an embodiment of the present disclosure. As will be explained in detail hereinafter, the locking ring 250 may be used to secure the actuating pin 200. In an embodiment, the ring 250 may be radially compressible, and may expand back into its original size and shape after being compressed and then released. In particular, the ring 250 may extend from a first end 252 to a second end 254, with the first end 252 and the second end 254 overlapping a center ring portion 256.

Figure 7:
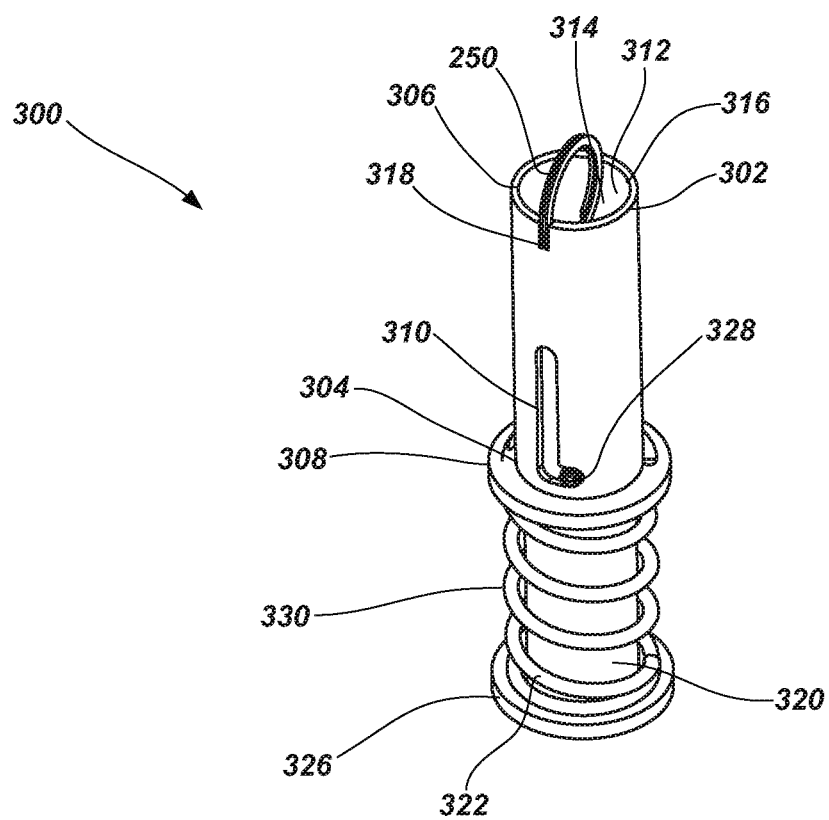
FIG. 7 is a view of a tool for installing a locking ring according to an embodiment of the present disclosure.

Referring now to FIG. 7, there is depicted an apparatus or tool 300 for installing the ring 250 into the actuator bore 112, and in particular, the annular groove 116 in the actuator bore 112. In an embodiment, the tool 300 may comprise a hollow body member 302 extending from a proximal end 304 to a distal end 306. The hollow body member 302 may be formed having any suitable external shape or internal shape, including but not limited to a tubular shape, a square shape, an octagonal shape, a trapezoidal shape, a triangular shape, or any other suitable shape. An annular lip 308 may be disposed on the proximal end 304 of the hollow body member 302. Formed in a sidewall of the body member 302 may be an L-shaped slot 310. The body member 302 may include an inner cylindrical sidewall 312 that forms a cylindrical bore 314 (also referred to as a ring-receiving space). Formed in a distal terminal end 316 of the body member 302 may be a notch 318 for receiving a locking ring as will be described in detail hereinafter.

Disposed in the bore 314 of the body member 302 may be a plunger 320 (the plunger may also be referred to as a pusher). The plunger 320 (or pusher) may extend from a proximal end 322 to a distal end 324 (not visible) and define a hollow cylindrical body. Formed on the proximal end 322 of the plunger 320 may be an annular rim 326. Extending from the plunger 320 may be a protrusion 328. The protrusion 328 may be located in the L-shaped slot 310 of the body member 302. It will be appreciated that the protrusion 328 and the L-shaped slot 310 may limit movement of the plunger 320 within the body member 302.

Disposed along the main body of the plunger 320 may be a resilient member 330, such as a spring. It will be appreciated that the resilient member 330 may bias the plunger 320. In particular, the resilient member 330 may be biased against the annular rim 326 of the plunger 320 and against the annular rim 308 of the body member 302. As shown in FIG. 7, the plunger 320 is in the retracted position as biased by the resilient member 330.

As shown, the notch 318 may be configured and adapted to receive the ring 250. In particular, the ring 250 may be oriented parallel to a longitudinal axis of the body member 302 and then placed in the notch 318. A user may then press the ring 250 into the bore 314 of the body member 302. As the user presses the ring 250, the ring 250 will compress radially inward to match the diameter of the bore 314. A user may then rotate the ring 250 such that it is perpendicular to the longitudinal axis of the body member 302 and slide it back against the plunger 320.

Figure 8:
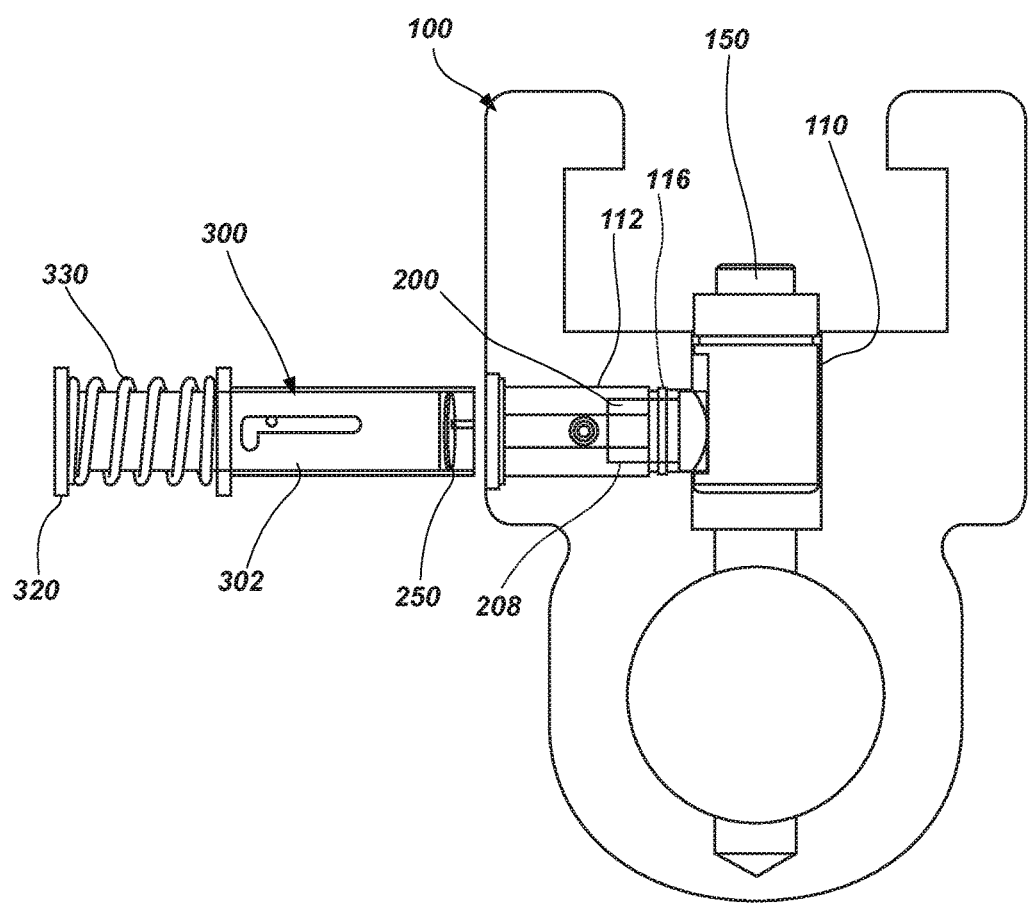
FIGS. 8-12 depict a process for installing a locking pin, actuating pin, locking ring, and key cylinder into a ball support member according to an embodiment of the present disclosure.

Referring now to FIGS. 7-11, a method of assembling the ball support member 100 using the tool 300 is shown and described according to an embodiment of the present disclosure, where like reference numerals depict like components. In FIG. 7, the locking ring 250 is installed into the bore 314 of the body member 302 of the tool 300 in the manner described above. Next, as shown in FIG. 8, the locking pin 150 and the actuating pin 200 are installed into the bores 110 and 112, respectfully. The tool 300 is then positioned at the entrance of the bore 112.

Figure 9:
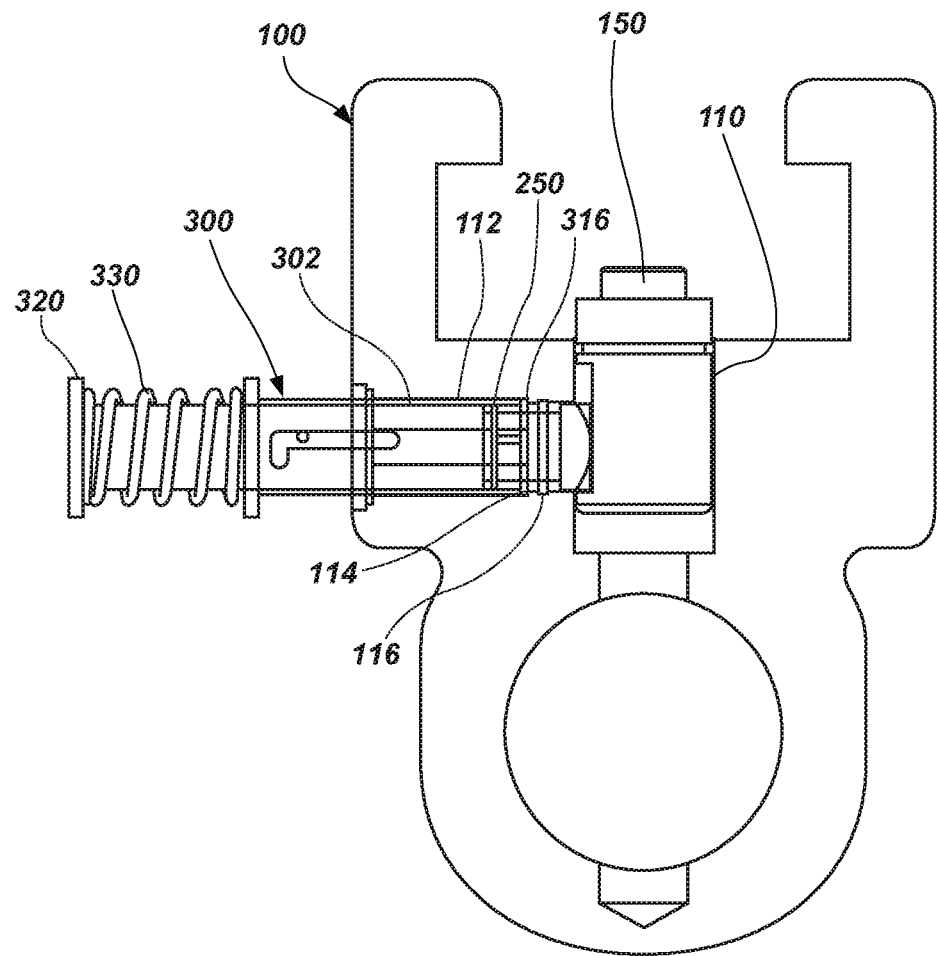
Figure 10:
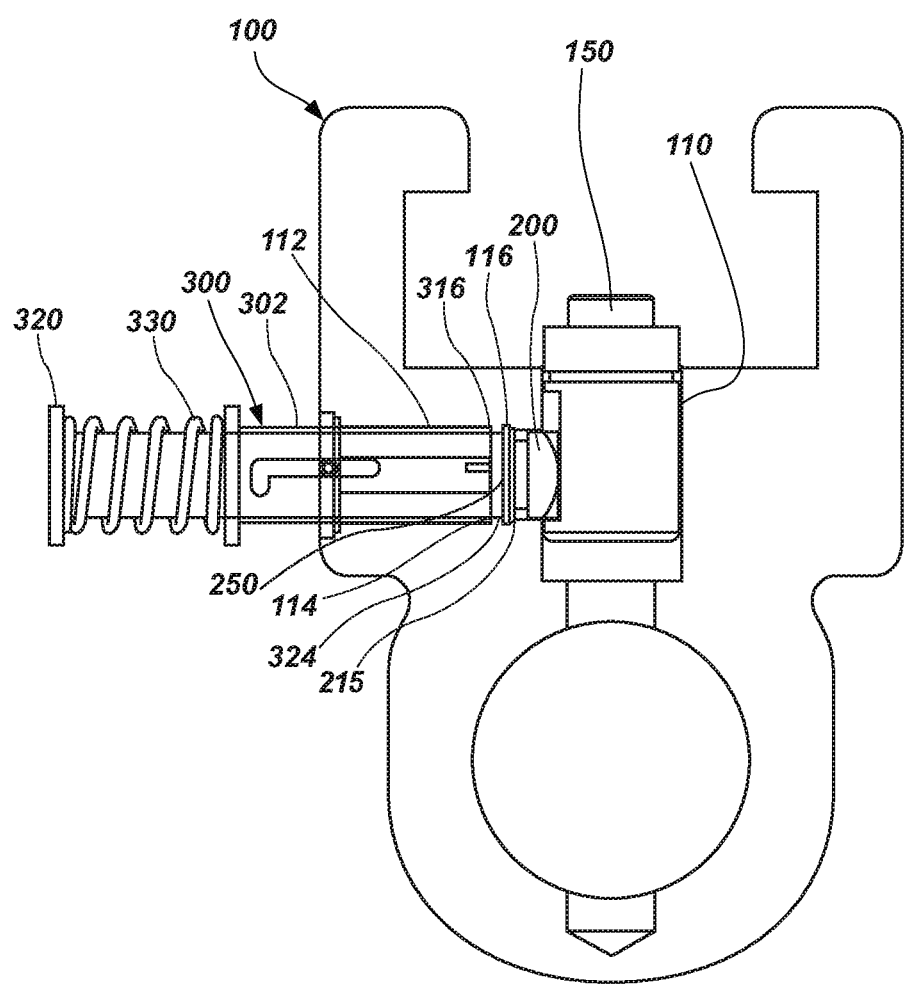

As shown in FIG. 9, the body member 302 of the tool 300 is advanced into the bore 112 until the distal terminal end 316 abuts against the shoulder 114 of the bore 112. As shown in FIG. 10, with the distal terminal end 316 placed against the shoulder 114 of the actuator bore 112, the plunger 320 is then actuated by a user such that its distal end 324 ejects the ring 250 from the body member 302 and into the annular groove 116 of the bore 112. When the locking ring 250 enters the annular groove 116, the compressed locking ring 250 expands into groove 116 and is thereby locked into place by filling into groove 116, and since annular groove 116 is larger in diameter than bore 112 and since the locking ring 250 expands to fill groove 116, locking ring 250 is held into place by the walls that define annular groove 116. The plunger 320 may include an inner cylindrical bore at its distal end 324 for receiving the first portion 208 of the actuating pin 200 (see FIGS. 5 and 8). Thus, the diameter of the inner cylindrical bore of the plunger 320 may be greater than diameter D4 shown in FIG. 5. By the same token, the outer diameter of the plunger 320 may be less than the diameter D2 shown in FIG. 3 in order to allow the distal end 324 of the plunger 320 to pass between the sidewall 113 of the actuating bore 112 and the first portion 208 of the actuating pin 200.

Figure 11:
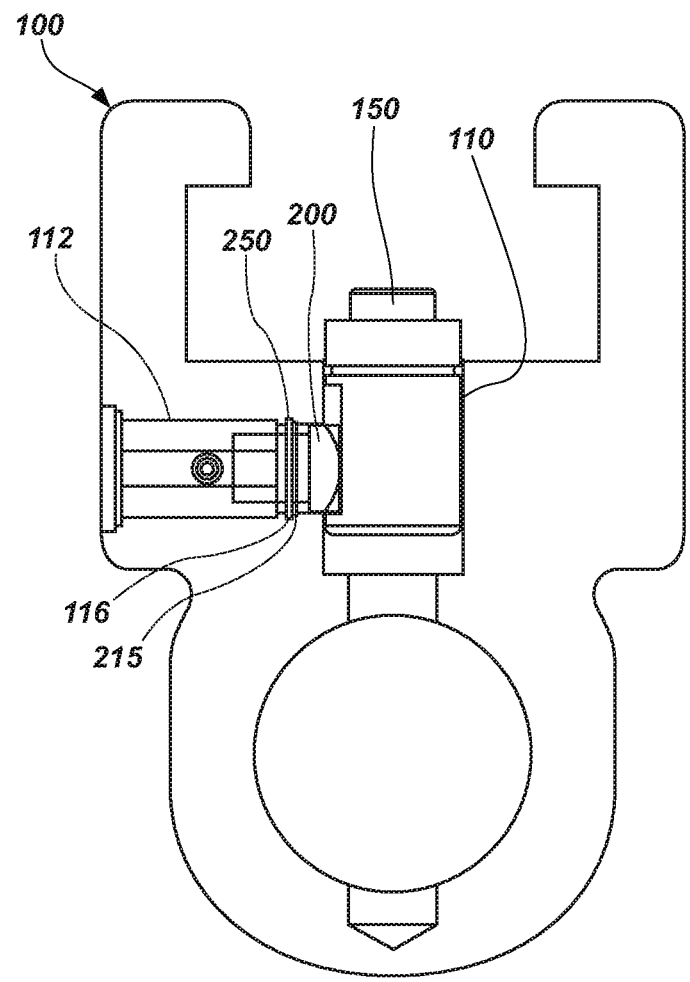

As shown in FIG. 11, with the annular ring 250 installed in the groove 116, the tool 300 is removed from the bore 112. The ring 250 may secure the actuating pin 200 in the bore 112 by abutting against the surface 215 extending from the actuating pin 200. It will be appreciated that as used herein, the concept of "abutting against" shall be construed broadly to include the concept of an item, such as annular ring 250, participating in or causing an abutting force to be applied on another item, such as the surface 215, including in cases that utilize an intervening member, such as a washer, interposed between the surface 215 and the ring 250.

In an embodiment, the surface 215 extending from the actuating pin 200 may be an annular surface. In an embodiment, an intervening member, such as a washer, may be interposed between the surface 215 of the actuating pin 200 and the locking ring 250.

Figure 12:
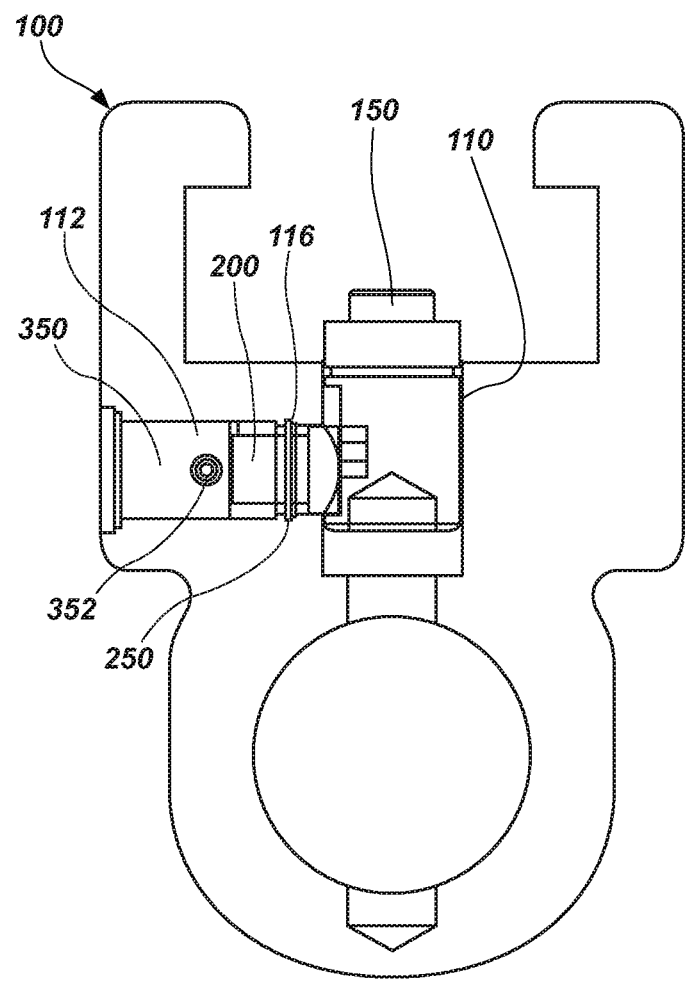

Referring now to FIG. 12, with the locking ring 250 installed into the groove 116 of the bore 112, a key cylinder 350 may be slidably inserted into the bore 112. The key cylinder 350 may accept a key to rotate the actuating pin 200 to thereby cause the locking pin 150 to engage a pin receiving hole in a drop bar of a hitch. In this regard, the actuating pin 200 may include a slot for receiving a protrusion extending from the key cylinder 350. A fastener 352 may be utilized to secure the key cylinder 350 in the bore 112.

The ball support member 100 may then be installed onto a drop bar of a hitch having a plurality of pin receiving holes. The drop bar may be connected to a shank portion configured and dimensioned to be installed into a receiver of a tow vehicle. The ball support member 100 may further include at least one ball attached thereto. In an embodiment, the ball support member 100 includes a pair of different sized hitch balls.

Figure 13:
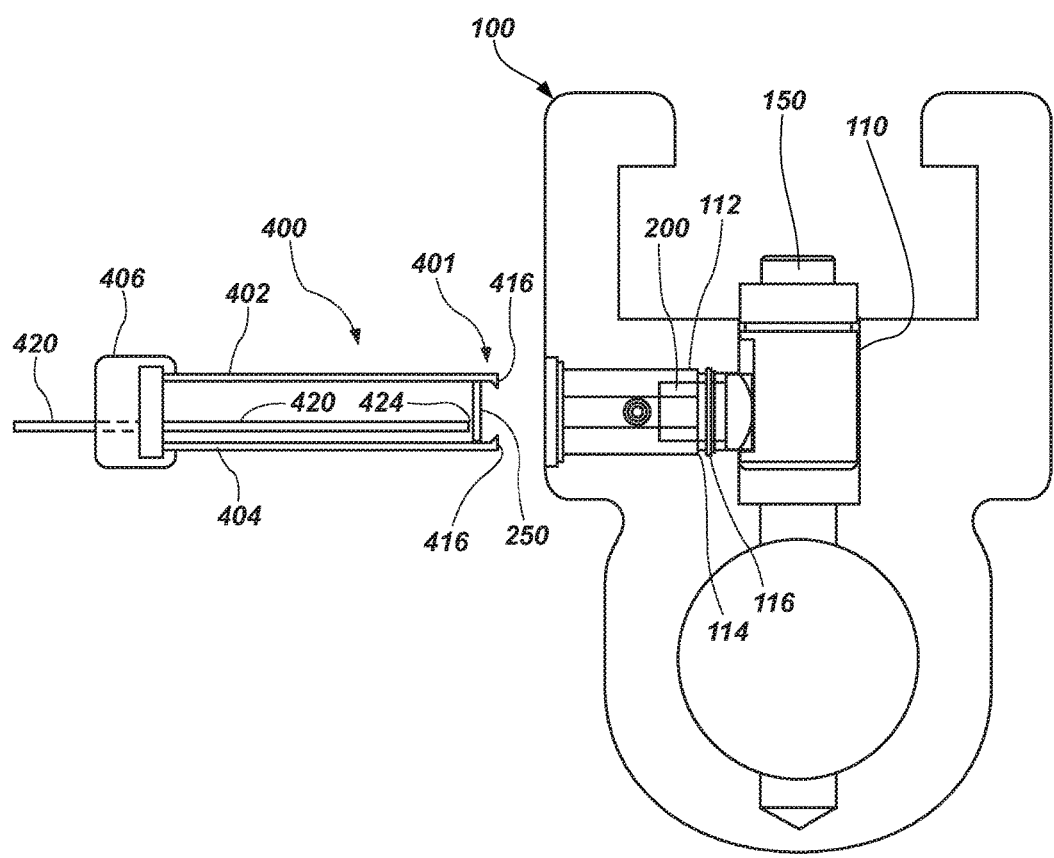
FIG. 13 is a view of an alternative embodiment of an installation tool shown in FIGS. 7-10.

Referring now to FIG. 13, an alternative embodiment for tool 300 is shown at 400. Tool 400 may include jaws 401 having a first jaw 402 and an opposing second jaw 404, both extending from a base 406. The base 406 may be configured and arranged as known in the field for holding firmly in place the two jaws 402 and 404, for example in the manner of a crescent wrench as known in the field, or a pipe wrench, or any suitable manner that enables jaws 401 to be held firmly in place such that jaw 402 and jaw 404 may be selectively moved toward and away from each other.

Referring still to FIG. 13, a method of assembling the ball support member 100 using the tool 400 according to an embodiment of the present disclosure, where like reference numerals depict like components, involve placing locking ring 250 between the jaws 402 and 404, and operating the base 406 (similar to a crescent wrench for example or a pipe wrench for example) to cause jaws 402 and 404 to move toward each other and compress lock ring 250. Next, the locking pin 150 and the actuating pin 200 are installed into the bores 110 and 112, respectfully. The tool 400 is then positioned at the entrance of the bore 112.

The jaws 402 and 404 of the tool 400 may be advanced into the bore 112 until distal terminal ends 416 of jaws 402 and 404 abut against the shoulder 114 of the bore 112. A pusher 420 may then be actuated by a user such that its distal end 424 (also referred to as a ring engaging surface) ejects the locking ring 250 from the jaws 402 and 404 into the annular groove 116 of the bore 112. The pusher 420 may be a simple rod or any suitable item capable of pushing the compressed locking ring 250 from the jaws 402 and 404 of tool 400. When the locking ring 250 enters the annular groove 116, the compressed locking ring 250 expands into groove 116 and is thereby locked into place by filling into groove 116, and since annular groove 116 is larger in diameter than bore 112 and since the locking ring 250 expands to fill groove 116, locking ring 250 is held into place by the walls that define annular groove 116.

The jaws 401 may be referred to as body member extending between a proximal end and a distal end. The body member, or jaws 401, may be described as having an outer surface and an inner surface, which may also be described as the jaw 402 having an inner surface and the jaw 404 having an inner surface. The inner surface of jaws 401 (or the inner surfaces of jaw 402 and jaw 404) may defining a ring-receiving space.

According to an embodiment, the present invention may include: a shank portion configured and adapted to be installed into a hitch receiver; a drop bar extending downwardly from the shank portion; a plurality of pin receiving holes formed in the drop bar; a ball support member, the ball support member having a body member that comprises a locking-pin bore and an actuator bore formed therein, wherein the actuator bore defines a cylindrical sidewall and an annular groove in said cylindrical sidewall, wherein the locking-pin bore and the actuator bore intersect; a locking pin disposed in said locking-pin bore of the ball support member, said locking pin having a distal end configured and dimensioned to be selectively received in one of the pin receiving holes formed in the drop bar to provide height adjustment variability between the ball support member and the drop bar; an actuator pin disposed in said actuator bore of the ball support member, said actuator pin having a body extending between a first end and a second end, said body further having a surface extending from an intermediate portion of said body; a locking ring disposed in said annular groove of the cylindrical sidewall of the actuator bore, said locking ring abutting against the surface of the actuator pin to prevent backout of the actuator pin. According to an embodiment, the present invention may include: a cam assembly interconnecting the actuator pin and the locking pin such that rotation of the actuator pin causes the locking pin to move linearly in the locking-pin bore.

According to an embodiment, the present invention may include a method of manufacturing a ball support member for use in a trailer hitch ball mount assembly, said method comprising: forming a body member; forming a locking-pin bore and an actuator bore in the body member, the actuator bore defining a cylindrical sidewall; forming an annular groove in the cylindrical sidewall of the actuator bore; installing a locking pin in the locking-pin bore; installing an actuating pin in the actuator bore, said actuator pin having a body extending between a first end and a second end, said body further having a surface extending from an intermediate portion of said body; installing a locking ring in the groove of the actuator bore such that the locking ring prevents backout of the actuating pin by engaging the surface extending from the intermediate portion of the body of the actuating pin; wherein rotation of the actuating pin causes the locking pin to advance and retract in the locking-pin bore.

In an embodiment, body support member may be formed of aluminum or some other material of sufficient strength. In an embodiment, the locking-pin bore and the actuator bore may be formed by a drill and drill bits of appropriate sizes. The annular groove in the actuator bore may be formed using a disc shaped cutting tool.

The method may further comprise the step of attaching a trailer ball to the body member. The method may further comprise the step of interconnecting the actuator pin and the locking pin with a cam assembly such that rotation of the actuator pin causes the locking pin to move linearly in the locking-pin bore. The method may further comprise the cam assembly having an eccentric protrusion and an eccentric slot. The method may further comprise installing a key lock cylinder in the actuator bore, wherein the actuator pin is interposed between the key lock cylinder and the locking pin, the key lock cylinder engaging the second end of the actuator pin. The method may further comprise forming a pair of spaced apart arms extending from the body member, the pair of spaced apart arms defining a slot for receiving a drop bar. The method may further comprise the step of installing a locking ring in the groove of the actuator bore comprises radially compressing the locking ring. The method further comprising compressing the locking ring in a cylindrical bore.

Those having ordinary skill in the relevant art will appreciate the advantages provide by the features of the present disclosure. For example, it is a feature of the present disclosure to provide a trailer hitch having an adjustable height ball support member. Another feature of the present disclosure to provide such a ball support member having an internal locking ring for maintaining the actuating pin. It is a further feature of the present disclosure, in accordance with one aspect thereof, to provide a tool for installing a locking ring.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for installing a locking ring in a groove of a bore, said apparatus comprising:
   a tubular body member extending between a proximal end and a distal end, the tubular body member having an outer surface and an inner surface, the inner surface defining a bore;
   a plunger extending between a proximal end and a distal end, the plunger disposed in the bore defined by the inner surface of the tubular body member, the distal end of the plunger defining a ring engaging surface;

wherein the plunger is operable between a deployment position and a retracted position, wherein the ring engaging surface of the plunger is closer to the distal end of the tubular body member in the deployment position than in the retracted position; and wherein the tubular body further comprises an end surface extending between the outer surface and the inner surface of said tubular body, the end surface being disposed at the distal end of said tubular body, and a ring receiving notch formed in the end surface.

2. The apparatus of claim 1, further comprising a resilient member for biasing the plunger.

3. The apparatus of claim 1, further comprising a slot in the tubular body member and a stop member extending from the plunger and extending into the slot such that the slot limits movement of the plunger along a longitudinal axis of the tubular body member.

4. The apparatus of claim 3, wherein the slot is L-shaped.

5. The apparatus of claim 1, wherein the bore formed by the inner surface of the tubular body member is cylindrical.

6. A method of installing a locking ring into an annular groove formed in a bore of a body member, the bore having a diameter, comprising:

providing a ring installation tool, said ring installation tool having a tubular body member extending between a proximal end and a distal end, the tubular body having an outer surface and an inner surface, the inner surface defining a bore, said ring installation tool further comprising a plunger extending between a proximal end and a distal end, the plunger disposed in the bore defined by the inner surface of the tubular body member, the distal end of the plunger defining a ring engaging surface, wherein the plunger is operable between an deployment position and a retracted position, wherein the ring engaging surface of the plunger is closer to the distal end of the tubular body member in the deployment position than in the retracted position;

installing the locking ring in the bore of the tubular body member of the ring installation tool and compressing the locking ring using a notch formed in the distal end of the tubular body member of the ring installation tool;

inserting the distal end of the tubular body into the bore of the body member to a desired depth;

actuating the plunger to the deployment position such that the ring engaging surface forces the locking ring from bore of the ring installation tool to allow the locking ring to expand into the annular groove of the body member; and withdrawing the tubular body from the bore of the body member.

7. The method of claim 6, wherein the ring installation tool further comprises a resilient member for biasing the plunger.

8. The method of claim 6, wherein the ring installation tool further comprises a slot in the tubular body member and a stop member extending from the plunger and extending into the slot such that the slot limits movement of the plunger via the stop member.

9. The method of claim 8, wherein the slot is L-shaped.

10. An apparatus for installing a locking ring in a groove of a bore, said apparatus comprising:

a tubular body member extending between a proximal end and a distal end, the tubular body having an outer surface and an inner surface, the inner surface defining a bore;

a plunger extending between a proximal end and a distal end, the plunger disposed in the bore defined by the inner surface of the tubular body member, the distal end of the plunger defining a ring engaging surface;

wherein the plunger is operable between an deployment position and a retracted position, wherein the ring engaging surface of the plunger is closer to the distal end of the tubular body member in the deployment position than in the retracted position;

an end surface extending between the outer surface and the inner surface of the tubular body, the end surface being disposed at the distal end of said tubular body;

a ring receiving notch formed in the end surface;

a resilient member for biasing the plunger;

a slot being formed in the tubular body member and a stop member extending from the plunger and extending into the slot such that the slot limits movement of the plunger along a longitudinal axis of the tubular body member;

wherein the slot is L-shaped;

wherein the bore formed by the inner surface of the tubular body member is cylindrical.

11. An apparatus for installing a locking ring in a groove of a bore, said apparatus comprising:

a tubular body member extending between a proximal end and a distal end, the tubular body member having an outer surface and an inner surface, the inner surface defining a bore;

a plunger extending between a proximal end and a distal end, the plunger disposed in the bore defined by the inner surface of the tubular body member, the distal end of the plunger defining a ring engaging surface;

wherein the plunger is operable between a deployment position and a retracted position, wherein the ring engaging surface of the plunger is closer to the distal end of the tubular body member in the deployment position than in the retracted position; and wherein the tubular body further comprises an end surface extending between the outer surface and the inner surface of said tubular body, the end surface being disposed at the distal end of said tubular body; and a resilient member for biasing the plunger.

12. The apparatus of claim 11, further comprising a ring receiving notch formed in the end surface.

13. The apparatus of claim 11, further comprising a slot in the tubular body member and a stop member extending from the plunger and extending into the slot such that the slot limits movement of the plunger along a longitudinal axis of the tubular body member.

14. The apparatus of claim 13, wherein the slot is L-shaped.

15. The apparatus of claim 11, wherein the bore formed by the inner surface of the tubular body member is cylindrical.

16. A method of installing a locking ring into an annular groove formed in a bore of a body member, the bore having a diameter, comprising:

providing a ring installation tool, said ring installation tool having a tubular body member extending between a proximal end and a distal end, the tubular body having an outer surface and an inner surface, the inner surface defining a bore, said ring installation tool further comprising a plunger extending between a proximal end and a distal end, the plunger disposed in the bore defined by the inner surface of the tubular body member, the distal end of the plunger defining a ring engaging surface, wherein the plunger is operable between an deployment position and a retracted position, wherein the ring engaging surface of the plunger is closer to the distal end of the tubular body member in the deployment position than in the retracted position, and wherein the ring installation tool further comprises a resilient member for biasing the plunger;

installing the locking ring in the bore of the tubular body member of the ring installation tool and compressing the locking ring;

inserting the distal end of the tubular body into the bore of the body member to a desired depth;

actuating the plunger to the deployment position such that the ring engaging surface forces the locking ring from bore of the ring installation tool to allow the locking ring to expand into the annular groove of the body member; and withdrawing the tubular body from the bore of the body member.

17. The method of claim 16, further comprising compressing the locking ring using a notch formed in the distal end of the tubular body member of the ring installation tool.

18. The method of claim 16, wherein the ring installation tool further comprises a slot in the tubular body member and a stop member extending from the plunger and extending into the slot such that the slot limits movement of the plunger via the stop member.

19. The method of claim 18, wherein the slot is L-shaped.

20. A method of installing a locking ring into an annular groove formed in a bore of a body member, the bore having a diameter, comprising:

providing a ring installation tool, said ring installation tool having a tubular body member extending between a proximal end and a distal end, the tubular body having an outer surface and an inner surface, the inner surface defining a bore, said ring installation tool further comprising a plunger extending between a proximal end and a distal end, the plunger disposed in the bore defined by the inner surface of the tubular body member, the distal end of the plunger defining a ring engaging surface, wherein the plunger is operable between an deployment position and a retracted position, wherein the ring engaging surface of the plunger is closer to the distal end of the tubular body member in the deployment position than in the retracted position, and a slot in the tubular body member and a stop member extending from the plunger and extending into the slot such that the slot limits movement of the plunger via the stop member;

installing the locking ring in the bore of the tubular body member of the ring installation tool;

inserting the distal end of the tubular body into the bore of the body member to a desired depth;

actuating the plunger to the deployment position such that the ring engaging surface forces the locking ring from bore of the ring installation tool to allow the locking ring to expand into the annular groove of the body member; and withdrawing the tubular body from the bore of the body member.

21. The method of claim 20, wherein installing the locking ring in the bore of the tubular body member of the ring installation tool further comprising compressing the locking ring.

22. The method of claim 21, further comprising compressing the locking ring using a notch formed in the distal end of the tubular body member of the ring installation tool.

23. The method of claim 21, wherein the ring installation tool further comprises a resilient member for biasing the plunger.

24. The method of claim 20, wherein the slot is L-shaped.

* * * * *